(12) United States Patent
Beattie, Jr. et al.

(10) Patent No.: US 8,315,181 B2
(45) Date of Patent: *Nov. 20, 2012

(54) SYSTEM AND METHOD FOR MAPPING POTENTIAL INTERNET PROTOCOL TELEVISION INTERFERENCE

(75) Inventors: James G. Beattie, Jr., Bergenfield, NJ (US); Stephen J. Griesmer, Westfield, NJ (US); Arvind R. Mallya, Walnut Creek, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 598 days.

This patent is subject to a terminal disclaimer.

(21) Appl. No.: 12/549,931

(22) Filed: Aug. 28, 2009

(65) Prior Publication Data

US 2011/0055884 A1  Mar. 3, 2011

(51) Int. Cl.
*H04J 1/16* (2006.01)
(52) U.S. Cl. .................. 370/252; 370/432; 379/1.01
(58) Field of Classification Search .................. None
See application file for complete search history.

(56) References Cited

U.S. PATENT DOCUMENTS

| | | | | |
|---|---|---|---|---|
| 8,144,616 B2* | 3/2012 | Beattie et al. | ............ | 370/252 |
| 2002/0060735 A1* | 5/2002 | Bowyer et al. | ............ | 725/9 |
| 2004/0214544 A1 | 10/2004 | Fawcett | | |
| 2006/0067237 A1 | 3/2006 | Burns et al. | | |
| 2007/0133421 A1 | 6/2007 | Young | | |
| 2007/0263778 A1 | 11/2007 | Aydin et al. | | |
| 2008/0188185 A1 | 8/2008 | Shi | | |
| 2009/0096665 A1* | 4/2009 | Maxson et al. | ......... | 342/357.08 |
| 2009/0144791 A1 | 6/2009 | Huffman et al. | | |
| 2009/0167945 A1 | 7/2009 | Tsui et al. | | |

* cited by examiner

*Primary Examiner* — Steven H Nguyen
(74) *Attorney, Agent, or Firm* — Guntin Meles & Gust, PLC; Ralph Trementozzi

(57) ABSTRACT

A method is disclosed for determining a mitigation strategy to limit a potential source of interference on an Internet Protocol television (IPTV) system. A new user installation request is received at a server in the IPTV system. A first geographical location of a customer premises associated with the new user installation request is received. A second geographical location of an amplitude modulation broadcasting facility is received. The first geographical location and the second geographical location are plotted. A first distance between the first geographical location and the second geographical location is determined. A first signal transmission power rating for the amplitude modulation broadcasting facility is retrieved. A first mitigation strategy to limit a first interference of the amplitude modulation broadcasting facility on an IPTV signal provided to the first geographical location when the first distance is less than the first threshold distance is determined.

20 Claims, 9 Drawing Sheets

SYSTEM AND METHOD FOR MAPPING POTENTIAL INTERNET PROTOCOL TELEVISION INTERFERENCE

FIELD OF THE DISCLOSURE

The present disclosure generally relates to communications networks, and more particularly relates to a system and a method for mapping potential Internet Protocol television interference.

BACKGROUND

An Internet Protocol television (IPTV) service provider can transmit an IPTV signal to a user via a central office, a serving area interface, and a residential gateway. The IPTV service provider can offer the user a variety of different television programs and/or movies. For example, the IPTV service providers can supply users with real-time television programs that are typically available for the users to watch only at a specific date and time. The IPTV service providers can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
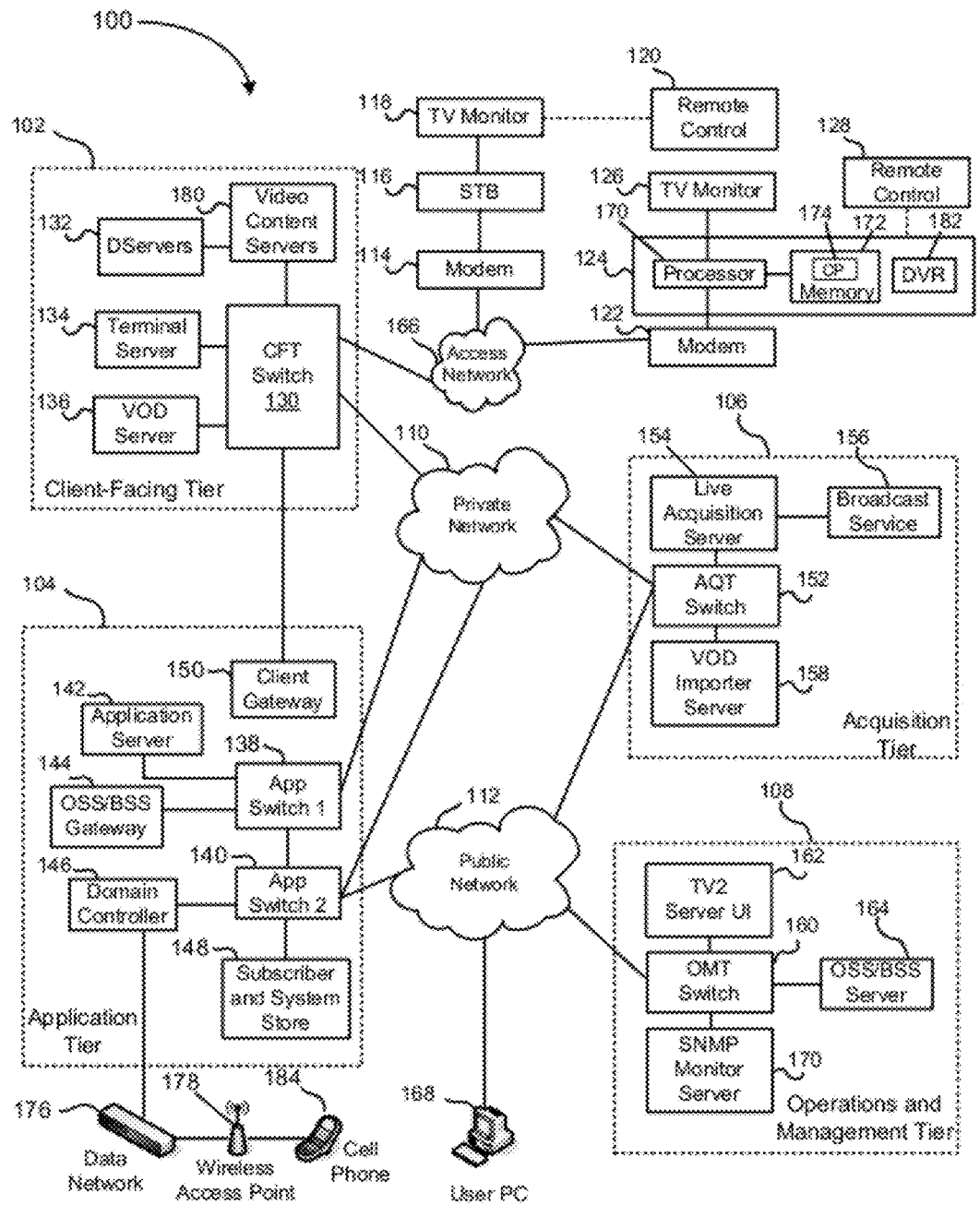
FIG. 1 is a block diagram of an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
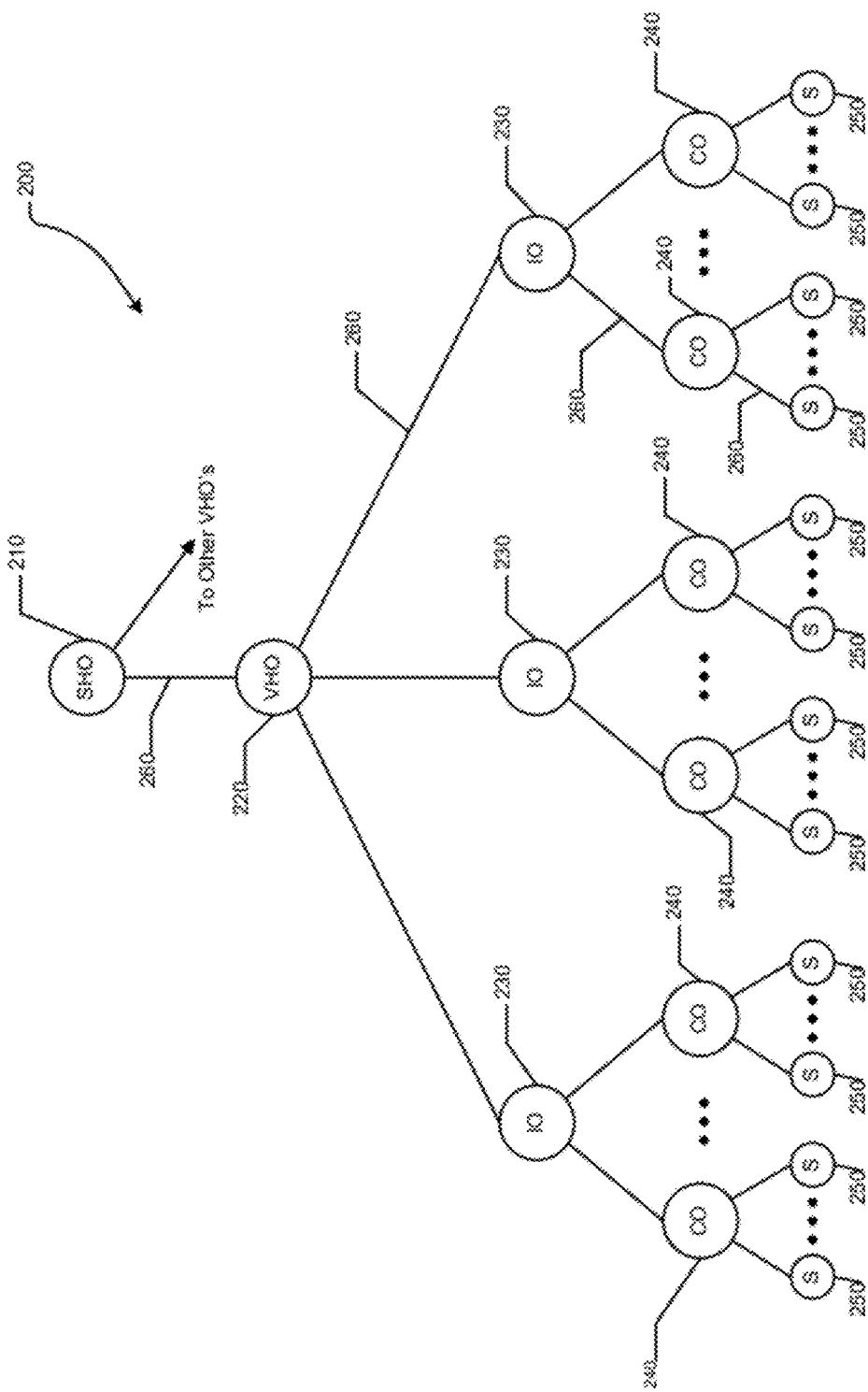
FIGS. 2 and 3 are block diagrams of an embodiment of an IPTV network.

FIG. 2 shows one example embodiment of a television distribution system or network 200, using IPTV technology in this example but not limited thereto, adapted to provide, among other things, the live television content features of the disclosed subject matter. The network 200 may include a super hub office (SHO) 210 for acquisition and encoding of video content, one or more video hub offices (VHO) 220 in each demographic market area (DMA), one or more intermediate offices (IO) 230, one or more central offices (CO) 240 located in each metropolitan area, and subscribers 250, who may be located in single or multiple dwelling units. In one example embodiment, the network 200 may be connected through a plurality of high speed communication links 260 using physical transport layers such as fiber, cable, twisted pair, air, or other media.

In one example embodiment of the IPTV video delivery system, the SHO 210 distributes content to one or more VHOs 220 which may be spread across a wide geographic territory, such as an entire country. The SHO 210 may, for example, be in a central location for acquisition and aggregation of national-level broadcast television (or linear) programming. A redundant SHO 210 may be provided for backup in case of failure. The SHO 210 may also provide the central point of live television content acquisition and insertion into the IPTV network. Linear programming may be received at the SHO 210 via satellite and processed for delivery to the VHO 220. Live television content may be received from various sources and processed/encoded to codec and bit-rate requirements for the communication network for transmission to the VHO 220 over the high speed communication links. The VHOs 220 are the video distribution points within each DMA or geographic region.

Figure 3:
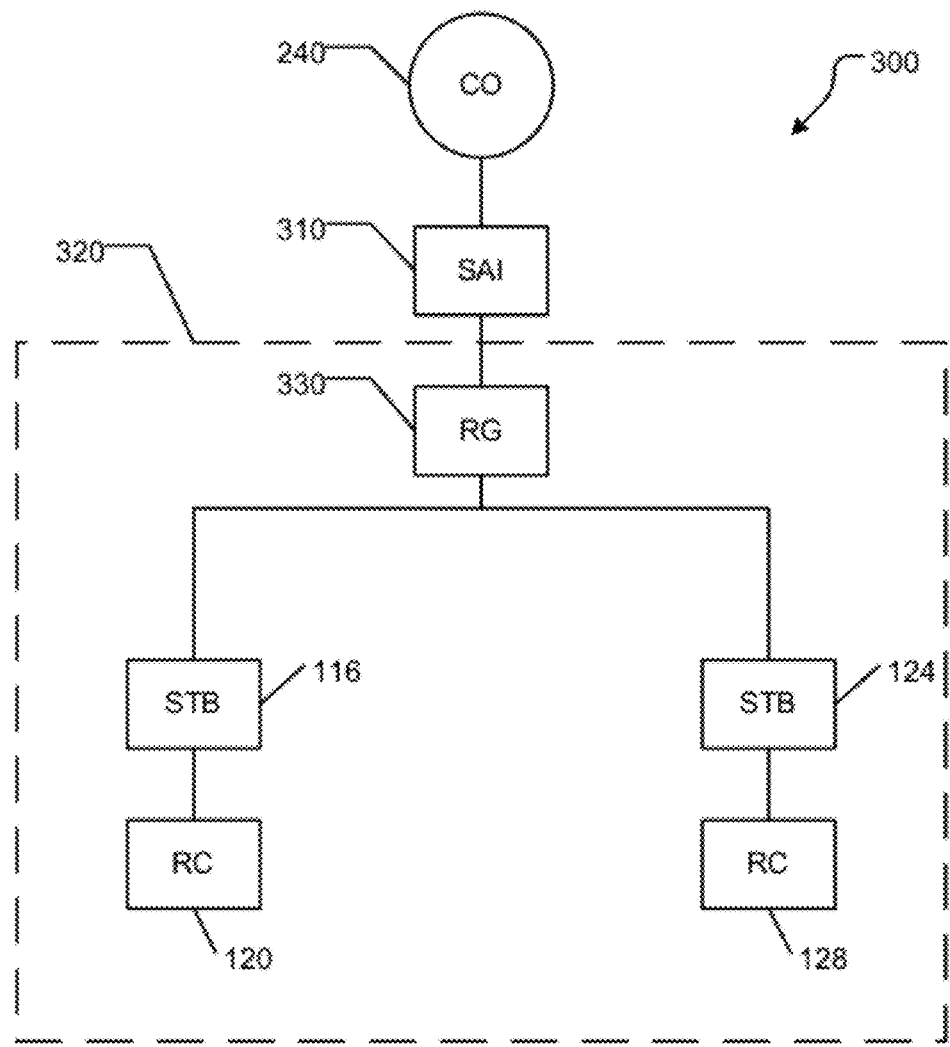

FIG. 3 shows an exemplary network architecture 300 between the CO 240 and customer premises equipment (CPE) 320 of the subscriber 250 shown in FIG. 2. A serving area interface (SAI) or video ready access device (VRAD) 310 may be connected to the CO 240. SAI 310 may, for example, be located in a weather-proof enclosure proximate the subscriber 250 premises, and may include fiber-to-the-node (FTTN) equipment, such as a digital subscriber line access multiplexer (DSLAM). FTTN equipment may also be located in the CO 240. The customer premises equipment (CPE) 320 includes, for example, a network interface device (not shown) and a residential gateway (RG) 330, with a built-in very-high-bit-rate digital subscriber loop (VDSL) modem or optical network termination (ONT). In either case the RG 330 may be connected to the rest of the home set-top box devices 116 and 124 via an internal network such as an Ethernet. The set-top box devices 116 and 124 each have an associated remote control device 120 and 128 which provides data entry to the set-top box devices to control the IPTV selections from the IPTV data streams.

Figure 4:
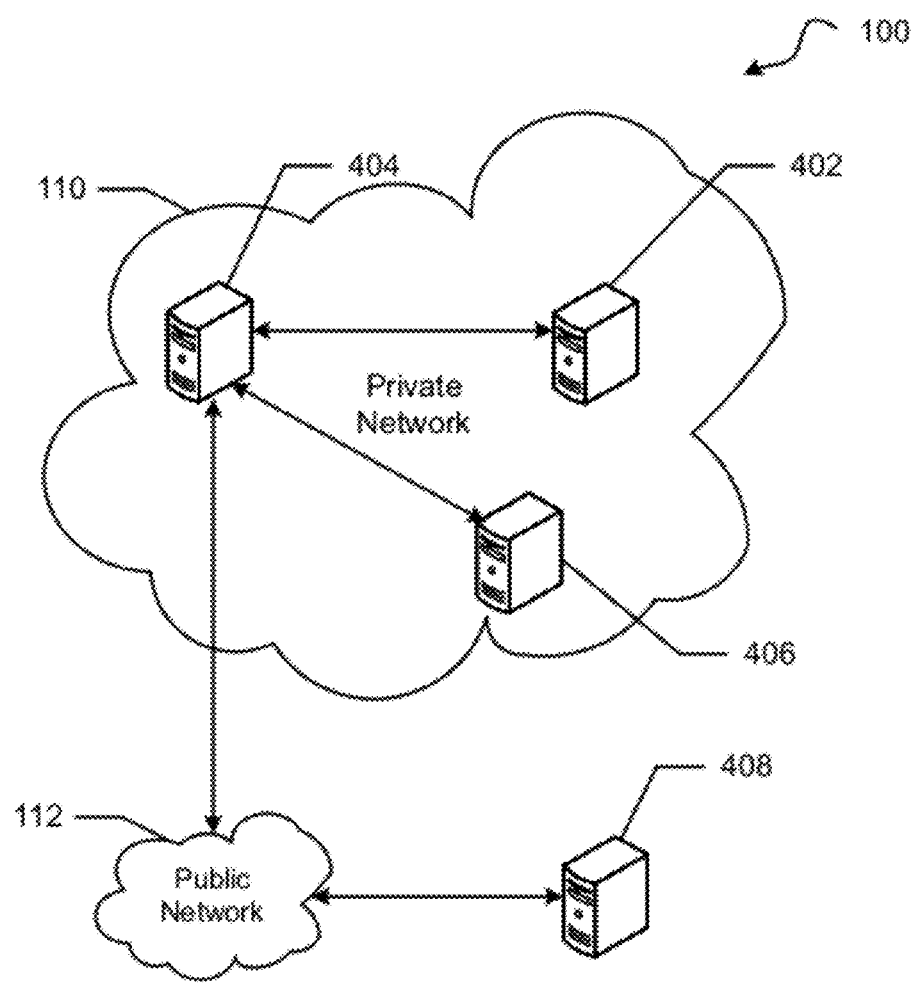
FIG. 4 is a block and schematic diagram of a portion of the IPTV system.

FIG. 4 shows a portion of the IPTV system 100 including an installation request server 402, a test server 404, and an IPTV server 406. In an embodiment, the installation request server 402, the test server 404, and the IPTV server 406 are all preferably located within an IPTV provider network, such as the private network 110. The installation request server 402 is in communication with the test server 404, which in turn is in communication with the IPTV server 406. In one embodiment, the test server 404 is also in communication with a Federal Communications Commission (FCC) server 408 via the public network 112.

The installation request server 402 can receive a new user installation request indicating a location of a new user installation and the type of service requested. For example, the new user installation request can indicate that a user connected to one of the RGs 330 has requested to receive IPTV service from the IPTV system 100 of FIG. 1. Alternatively, the new user installation request may be a proposal by the IPTV service provider to install IPTV cabling from the VRAD 310 to each of the RGs 330 and/or customer premises within a new neighborhood. In one embodiment, the IPTV cable can preferably be a twisted pair wire between the VRAD 310 and the RG 330. In another embodiment, the IPTV cable can be a fiber optic cable connecting the VRAD 310 to the RG 330. The installation request server 402 can forward the new user installation request to the test server 404. After receiving the new user installation request, the test server 404 can determine if any potential interferences to the IPTV signal exist within a geographical location associated with the user connected to the RG 330 and the VRAD 310.

While determining any potential interferences, the test server 404 can retrieve information about an area surrounding the geographical location of the new user installation from the IPTV server 406. The information can include a geographical location of the each of the VRADs 310, a geographical location of each of the RGs 330 and/or customer premises, a geographical location of projected IPTV cable routes from the VRADs to each of the RGs and/or customer premises, and the like. The test server 404 can access a database of the FCC server 408 to retrieve geographical locations of amplitude modulation (AM) broadcasting facilities and amateur radio operators, which can be potential interferences for an IPTV signal transmitted over the IPTV cables from the VRADs 310 to the RGs 330 and/or the customer premises. The test server 404 can also access the FCC server 408 to retrieve power levels and/or transmission power ratings for the signals broadcast from the AM broadcasting facility and/or the amateur radio operator. Upon retrieving the information from the IPTV server 406 and the FCC server 408, the test server 404 can plot and/or map graphical representations of the VRADs 310, the RGs 330, the IPTV cable routes 502, the AM broadcasting facilities, and the amateur radio operators at different locations on a graphical user interface (GUI) representing a large area surrounding the location associated with the new user installation, as shown in FIG. 5.

Figure 5:
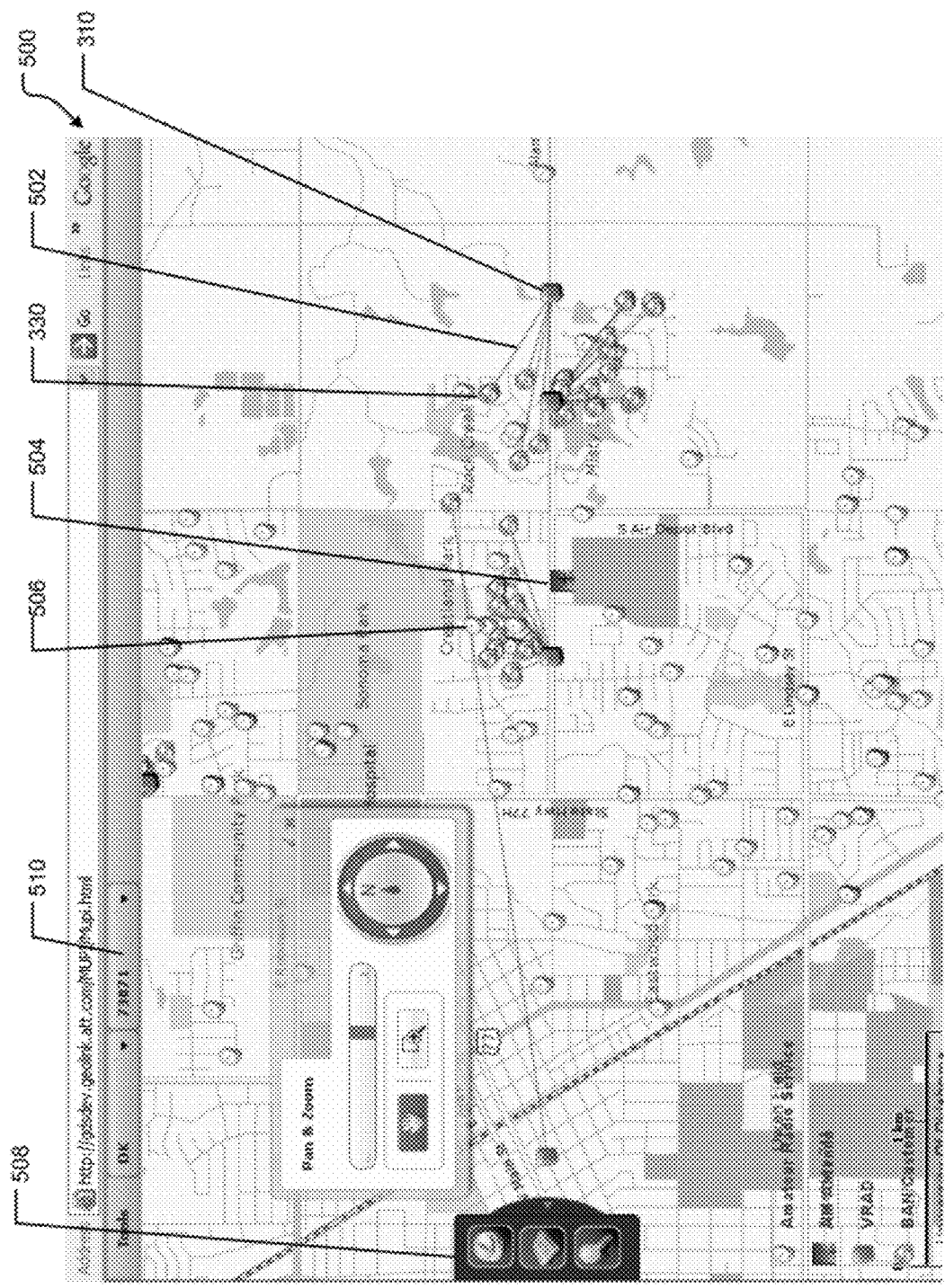
FIG. 5 is an exemplary screen shot of a mapping of potential sources of interference with an IPTV signal.

FIG. 5 shows an exemplary screen shot 500 of a plot of sources of potential IPTV signal interference. The exemplary screen shot 500 includes potential IPTV cable routes 502 to connect the VRADs 310 with the RGs 330, an AM broadcasting facility 504, amateur radio operators 506, a navigation panel 508, and a search toolbar 510. In an embodiment, the screen shot 500 can be a GUI associated with the test server 404 such that a user can enter a location into the search tool bar 510 and can view graphical representations of the VRADs 310, the RGs 330, the IPTV cable routes 502, the AM broadcasting facilities 504, and amateur radio operators 506 located within the specific location. For example, the test server 404 can use the location, such as a zip code, entered into the search toolbar 510 to search and retrieve the information associated with a large geographical location around the area from the IPTV server 406 and the FCC server 408. The test server 404 can then display graphical representations of the large geographical location as shown in the exemplary screen shot 500.

When the different geographical representations are plotted and/or mapped, the test server 404 can determine the distances between the AM broadcasting facilities 504 and the VRADs 310, the RGs and/or customer premises 330, and the projected IPTV cable routes 502. The test server 404 can also determine the distances between the amateur radio operators 506 and the VRADs 310, the RGs and/or customer premises 330, and the projected IPTV cables routes 502. Each of the distances can be stored in a database of the test server 404 for later reference.

In an embodiment, the user can vary the GUI display of the large geographical location. For example, if the user wants to view a specific location of the area entered into the search toolbar 510, the user can utilize the navigation panel 508 to pan across the area, zoom in or out in on a specific location, and the like. Thus, the GUI displayed by the test server 404 can provide the user with a graphical representation of the locations and distances between the VRADs 310, the RGs and/or customer premises 330, the projected IPTV cables routes 502, the AM broadcasting facilities 504, and the amateur radio operators 506. The test server 404 can retrieve the power levels and/or transmission power ratings for the signals broadcast from each AM broadcasting facility 504 and/or amateur radio operator 506. For example, the power level for the signals can range from two hundred Watts to fifty Kilowatts depending on the AM broadcasting facility 504. The amateur radio operator 506 can have power levels that range from two hundred Watts to one and one half Kilowatts, but with the use of gain antennas and effects of local conditions the power level experienced by the IPTV system can be higher.

An amount potential interference caused by the AM broadcasting facility 504 and/or the amateur radio operator 506 can depend on a combination of the power levels of the broadcast signals from the AM broadcasting facility and/or the amateur radio operator, and the distance the AM broadcasting facility and/or the amateur radio operator are from the VRAD 310, the RG 330, and/or the IPTV cable route 502. Thus, a threshold distance for determining potential interference can vary depending on the power level of the broadcast signal from the AM broadcasting facility 504 and the amateur radio operator 506. For example, if the AM broadcasting facility 504 operates with a power level of five Kilowatts for the broadcast signal, the threshold distance can be ten kilometers before the AM broadcasting facility causes any potential interference with an IPTV signal. However, if the amateur radio operator 506 transmits at a power level of one and one-half kilowatts for the broadcast signal, the threshold distance for the amateur radio operator can be one kilometer.

Thus, the test server 404 can determine whether there might be potential interferences with an IPTV signal traveling over the IPTV cable route 502 from the VRAD 310 to the RG 330 based on whether the AM broadcasting facility 504 and/or the amateur radio operator 506 are within the threshold distance as determined in response to the power level of the broadcast signal from either the AM broadcasting facility and/or the amateur radio operator. The sources of potential interference can cause problems with the IPTV signal, Voice over Internet Protocol (VoIP) telephone signal, and/or IP data signals transmitted over the IPTV cable route 502. The possible problems caused by the potential interference can include an inability for the RG 330 to synchronize with the VRAD 310, pixelization and/or loss of IPTV video signal, dropout or complete loss of the VoIP telephone signal, intermediate and/or continuous disruption of data sent over the IP data line of the IPTV cable route 502, and the like.

Upon identifying at least one potential interference of the IPTV signal, the test server 404 can select different mitigation strategies to limit the effect of the potential interference. The mitigation strategies can include repairing the IPTV cable route 502, connecting bridge taps in the VRAD 310, twisting the IPTV cables located in the VRAD, installing filters at the RGs and/or customer premises 330, and the like. The filters can be designed to block signals within the frequency ranges of the broadcast signals from the AM broadcasting facility 504 and the amateur radio operator 506. The test server 404 can assign these mitigation strategies as a support ticket for the technicians responsible for completing the new user installation request.

Figure 6:
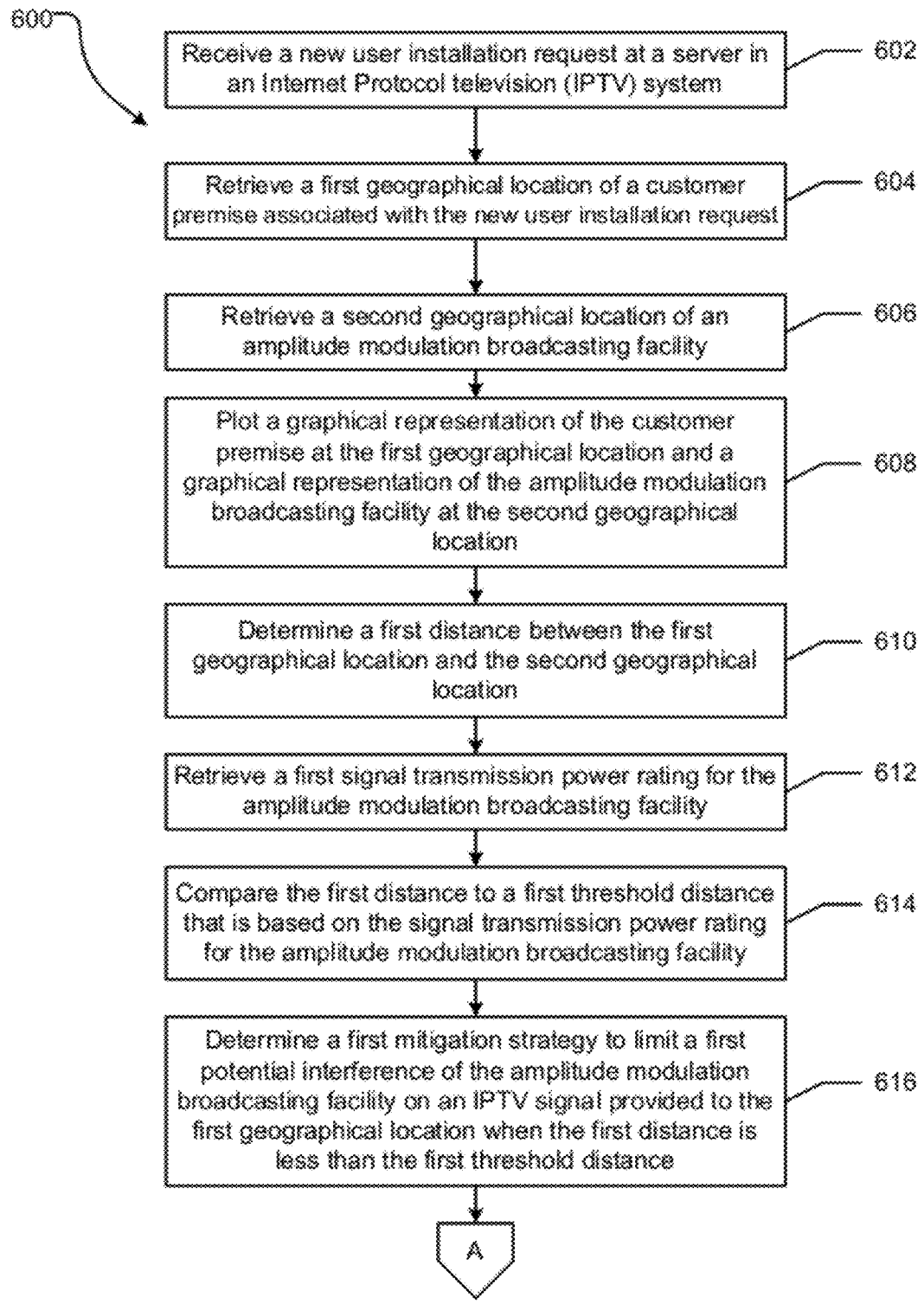
FIGS. 6-8 are a flow diagram of a method for determining multiple mitigation strategies to limit the potential sources of interference with the IPTV signal.
Figure 7:
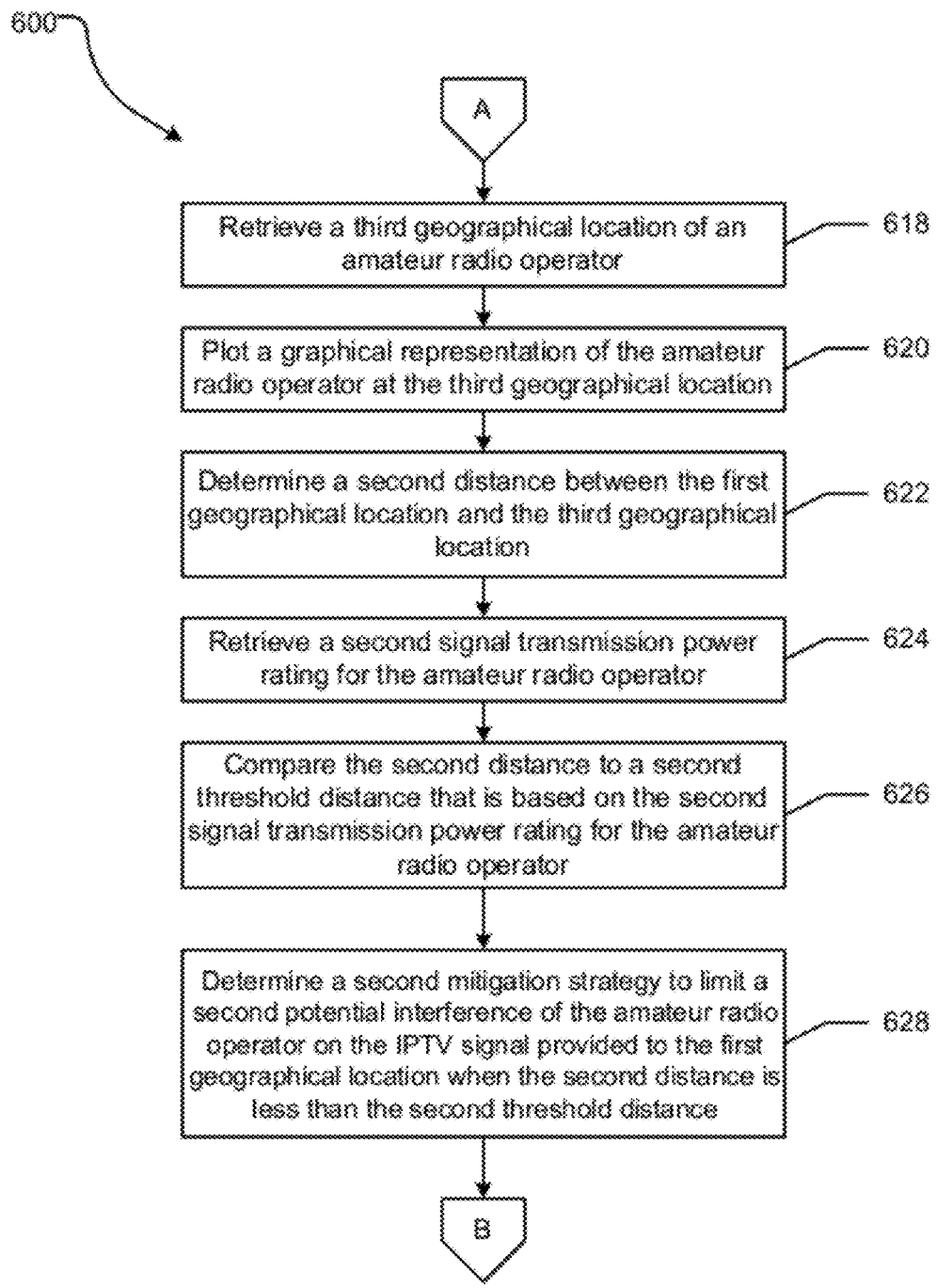
Figure 8:
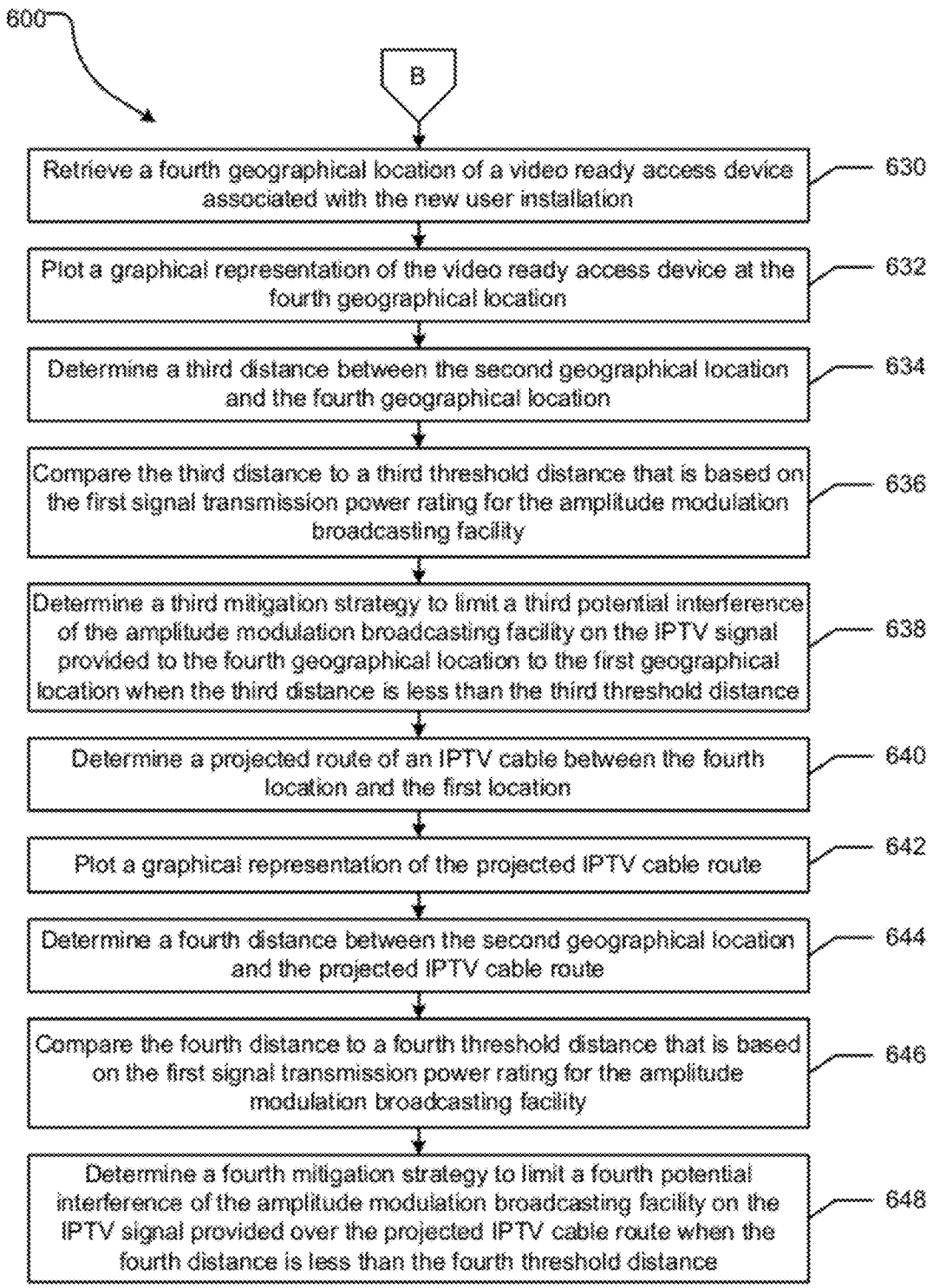

FIGS. 6-8 show a flow diagram of a method 600 for determining multiple mitigation strategies to limit potential interferences of an IPTV signal. At block 602, a new installation request is received at a server in an IPTV system. A first geographical location of a customer premises associated with the new user installation request is retrieved at block 604. The first geographical location of the customer premises can be retrieved from a database of the IPTV service provider. At block 606, a second geographical location of an amplitude modulation (AM) broadcasting facility is retrieved. The second geographical location of the AM broadcasting facility can be retrieved from a database of the federal communication commission (FCC). A graphical representation of the customer premises is plotted at the first geographical location and a graphical representation of the AM broadcasting facility is plotted at the second geographical location at block 608. The plot of the graphical representations of the customer premises and the AM broadcasting facility can be on a GUI representing a large area surrounding the first and second geographical locations.

At block 610, a first distance between the first geographical location and the second geographical location is determined. A first signal transmission power rating for the AM broadcasting facility can be retrieved at block 612. The first signal transmission power rating can be retrieved from the database of the FCC. At block 614, the first distance is compared to a first threshold distance that is based on the signal transmission power rating for the AM broadcasting facility. For example, the first threshold distance can be a larger or smaller distance based on the signal transmission power rating for the AM broadcasting facility being lesser or greater. At block 616, a first mitigation strategy to limit a first potential interference of the AM broadcasting facility on an IPTV signal provided to the first geographical location is determined when the first distance is less than the first threshold distance.

At block 618, a third geographical location of an amateur radio operator is retrieved. A graphical representation of the amateur radio operator is plotted at the third geographical location at block 620. The plot of the graphical representation of the amateur radio operator can be on the GUI as described above. At block 622, a second distance is determined between the first geographical location and the third geographical location. A second signal transmission power rating for the amateur radio operator is retrieved at block 624. At block 626, the second distance is compared to a second threshold distance that is based on the second signal transmission power rating for the amateur radio operator. At block 628, a second mitigation strategy to limit a second potential interference of the amateur radio operator on the IPTV signal provided to the first geographical location is determined when the second distance is less than the second threshold distance.

At block 630, a fourth geographical location of a video ready access device (VRAD) associated with the new user installation request is retrieved. A graphical representation of the VRAD is plotted at the fourth geographical location of at block 632. The plot of the graphical representation of the VRAD can be on the GUI as described above. At block 634, a third distance is determined between the second geographical location and the fourth geographical location. The third distance is compared to a third threshold distance that is based on the first signal transmission power rating for the AM broadcasting facility at block 636. At block 638, a third mitigation strategy to limit a third potential interference of the AM broadcasting facility on the IPTV signal provided from the fourth geographical location to the first geographical location is determined when the third distance is less than the third threshold distance.

At block 640, a projected IPTV cable route is determined between the fourth location and the first location. A graphical representation of the projected IPTV cable route is plotted at block 642. The plot of the graphical representation of the projected IPTV cable route can be on the GUI as described above. At block 644, a fourth distance between the second geographical location of the AM broadcasting facility and the projected route of the IPTV cable is determined. The fourth distance is compared to a fourth threshold distance that is based on the first signal transmission power rating for the AM broadcasting facility at block 646. At block 648, a fourth mitigation strategy to limit a fourth potential interference of the AM broadcasting facility on the IPTV signal provided over the projected route of the IPTV cable is determined when the fourth distance is less than the fourth threshold distance.

Figure 9:
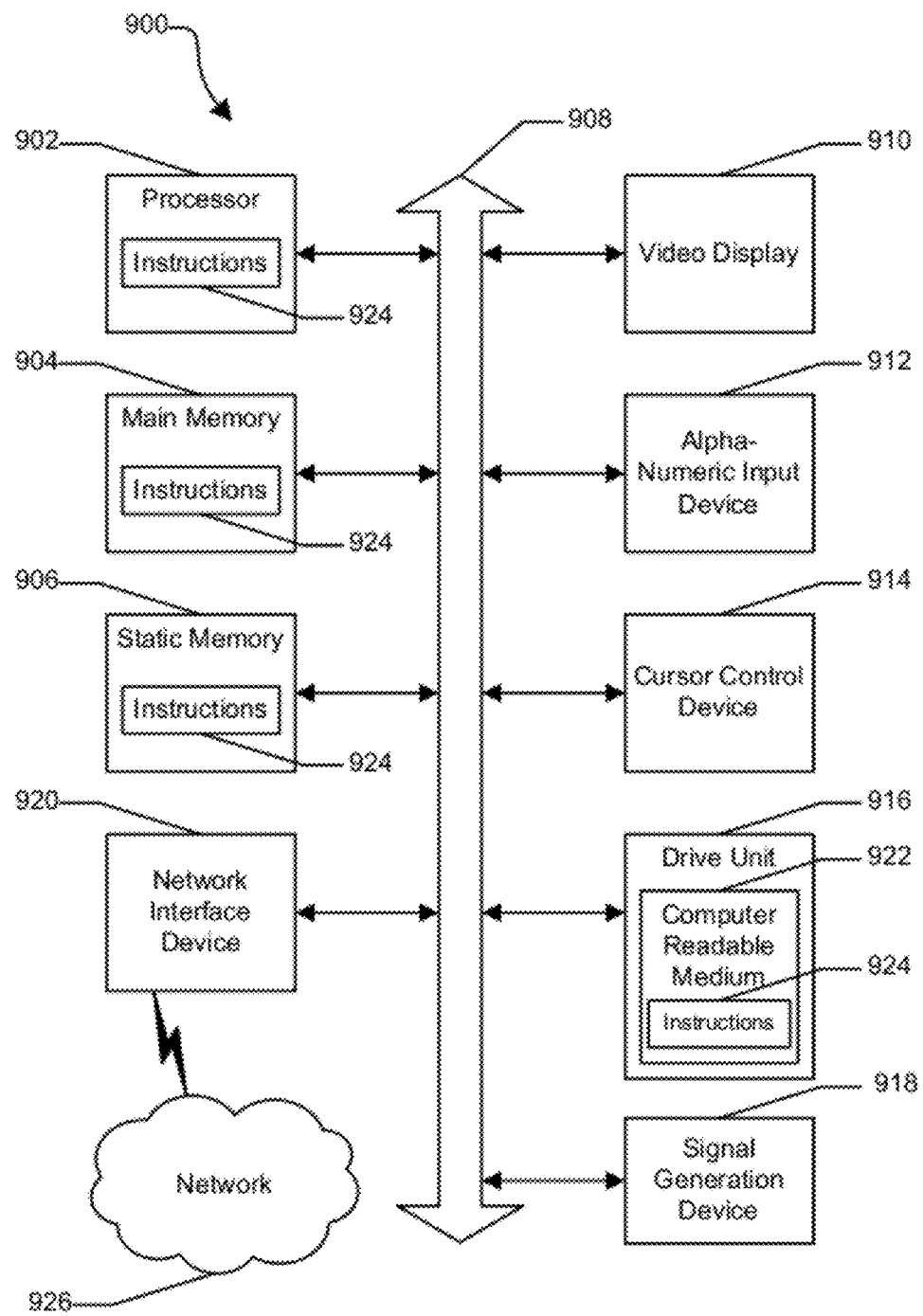
FIG. 9 is an illustrative embodiment of a general computer system.

FIG. 9 shows an illustrative embodiment of a general computer system 900. The computer system 900 can include a set of instructions that can be executed to cause the computer system to perform any one or more of the methods or computer based functions disclosed herein. The computer system 900 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

The computer system 900 may include a processor 902, such as a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910 such as a liquid crystal display (LCD), an organic light emitting diode (OLED), a flat panel display, a solid state display, or a cathode ray tube (CRT). Additionally, the computer system 900 may include an input device 912 such as a keyboard, and a cursor control device 914 such as a mouse. The computer system 900 can also include a disk drive unit 916, a signal generation device 918 such as a speaker or remote control, and a network interface device 920 to communicate with a network 926. In a particular embodiment, the disk drive unit 916 may include a computer-readable medium 922 in which one or more sets of instructions 924, such as software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A device comprising:
a memory storing computer instructions; and
a processor coupled to the memory, wherein the processor responsive to executing the computer instructions, performs operations comprising:
receiving a new user installation request at a server in an Internet protocol television system;
retrieving a first geographical location of a customer premises associated with the new user installation request;
retrieving a second geographical location of an amplitude modulation broadcasting facility;
plotting the first geographical location of the customer premises and the second geographical location of the amplitude modulation broadcasting facility;
determining a first distance between the first geographical location and the second geographical location;
retrieving a first signal transmission power rating for the amplitude modulation broadcasting facility;
comparing the first distance to a first threshold distance that is based on the first signal transmission power rating for the amplitude modulation broadcasting facility; and
determining a first mitigation strategy to limit a first interference of the amplitude modulation broadcasting facility on an Internet protocol television signal provided to the first geographical location when the first distance is less than the first threshold distance.

2. The device of claim 1 wherein the processor, responsive to executing the computer instructions performs operations comprising:
retrieving a third geographical location of equipment of an amateur radio operator;
plotting the third geographical location of the equipment of the amateur radio operator;
determining a second distance between the first geographical location and the third geographical location;
retrieving a second signal transmission power rating for the equipment of the amateur radio operator;
comparing the second distance to a second threshold distance that is based on the second signal transmission power rating for the equipment of the amateur radio operator; and
determining a second mitigation strategy to limit a second interference of the equipment of the amateur radio operator on the Internet protocol television signal provided to the first geographical location when the second distance is less than the second threshold distance.

3. The device of claim 1 wherein the processor, responsive to executing the computer instructions performs operations comprising:
retrieving a third geographical location of a video ready access device associated with the new user installation request;
plotting the third geographical location of the video ready access device;
determining a second distance between the second geographical location and the third geographical location;
comparing the second distance to a second threshold distance that is based on the first signal transmission power rating for the amplitude modulation broadcasting facility; and
determining a second mitigation strategy to limit a second interference of the amplitude modulation broadcasting facility on the Internet protocol television signal provided from the second geographical location to the first geographical location when the second distance is less than the second threshold distance.

4. The device of claim 3 wherein the processor, responsive to executing the computer instructions performs operations comprising:
determining a projected route of an Internet protocol television cable between the third geographical location and the first geographical location;
plotting the projected route of the Internet protocol television cable;
determining a third distance between the second geographical location and the projected route of the Internet protocol television cable;
comparing the third distance to a third threshold distance that is based on the first signal transmission power rating for the amplitude modulation broadcasting facility; and
determining a third mitigation strategy to limit a third interference of the amplitude modulation broadcasting facility on the Internet protocol television signal provided over the projected route of the Internet protocol television cable when the third distance is less than the third threshold distance.

5. The device of claim 1 wherein the first interference of the amplitude modulation broadcasting facility causes a signal degradation of the Internet protocol television signal.

6. The device of claim 1 wherein the first interference of the amplitude modulation broadcasting facility causes pixelization of an output of the Internet protocol television signal.

7. The device of claim 1 wherein the first mitigation strategy causes filters to filter the Internet protocol television signal according to a frequency range associated with a signal of the amplitude modulation broadcasting facility, wherein the filters are installed at the customer premises.

8. A method comprising:
receiving, by a system comprising at least one processor, a new user installation request at a server in an Internet protocol television system;
retrieving, by the system, a first geographical location of a customer premises associated with the new user installation request;
retrieving, by the system, a second geographical location of an amplitude modulation broadcasting facility;
plotting, by the system, the first geographical location of the customer premises and the second geographical location of the amplitude modulation broadcasting facility;

determining, by the system, a first distance between the first geographical location and the second geographical location;

retrieving, by the system, a first signal transmission power rating for the amplitude modulation broadcasting facility;

comparing, by the system, the first distance to a first threshold distance that is based on the first signal transmission power rating for the amplitude modulation broadcasting facility; and determining, by the system, a first mitigation strategy to limit a first interference of the amplitude modulation broadcasting facility on an Internet protocol television signal provided to the first geographical location when the first distance is less than the first threshold distance.

9. The method of claim 8 further comprising:

retrieving, by the system, a third geographical location of equipment of an amateur radio operator;

plotting, by the system, the third geographical location of the equipment of the amateur radio operator;

determining, by the system, a second distance between the first geographical location and the third geographical location;

retrieving, by the system, a second signal transmission power rating for the equipment of the amateur radio operator;

comparing, by the system, the second distance to a second threshold distance that is based on the second signal transmission power rating for the equipment of the amateur radio operator; and determining, by the system, a second mitigation strategy to limit a second interference of the equipment of the amateur radio operator on the IPTV signal provided to the first geographical location when the second distance is less than the second threshold distance.

10. The method of claim 8 further comprising:

retrieving, by the system, a third geographical location of a video ready access device associated with the new user installation request;

plotting, by the system, the third geographical location of the video ready access device;

determining, by the system, a second distance between the second geographical location and the third geographical location;

comparing, by the system, the second distance to a second threshold distance that is based on the first signal transmission power rating for the amplitude modulation broadcasting facility; and determining, by the system, a second mitigation strategy to limit a second interference of the amplitude modulation broadcasting facility on the Internet protocol television signal provided from the second geographical location to the first geographical location when the second distance is less than the second threshold distance.

11. The method of claim 10 further comprising:

determining, by the system, a projected route of an Internet protocol television cable between the third geographical location and the first geographical location;

plotting, by the system, the projected route of the Internet protocol television cable; determining a third distance between the second geographical location and the projected route of the Internet protocol television cable;

comparing, by the system, the third distance to a third threshold distance that is based on the first signal transmission power rating for the amplitude modulation broadcasting facility; and determining, by the system, a third mitigation strategy to limit a third interference of the amplitude modulation broadcasting facility on the Internet protocol television signal provided over the projected route of the Internet protocol television cable when the third distance is less than the third threshold distance.

12. The method of claim 8 wherein the first interference of the amplitude modulation broadcasting facility causes a signal degradation of the Internet protocol television signal.

13. The method of claim 8 wherein the first interference of the amplitude modulation broadcasting facility causes pixelization of an output of the Internet protocol television signal.

14. The method of claim 8 wherein the first mitigation strategy causes filters to filter the Internet protocol television signal according to a frequency range associated with a signal of the amplitude modulation broadcasting facility, wherein the filters are installed at the customer premises.

15. A method comprising:

receiving, by a system comprising at least one processor, a request to display a plurality of potential sources of interference with an Internet protocol television signal within an area;

retrieving, by the system, a first geographical location of a customer premises associated with the area;

retrieving, by the system, a second geographical location of an amplitude modulation broadcasting facility;

plotting, by the system, the first geographical location of the customer premises and the second geographical location of the amplitude modulation broadcasting facility;

determining, by the system, a first distance between the first geographical location and the second geographical location;

retrieving, by the system, a first signal transmission power rating for the amplitude modulation broadcasting facility;

comparing, by the system, the first distance to a first threshold distance that is based on the first signal transmission power rating for the amplitude modulation broadcasting facility; and determining, by the system, a first mitigation strategy to limit one of the potential sources of interference with the Internet protocol television signal that is caused by the amplitude modulation broadcasting facility on an Internet protocol television signal provided to the first geographical location when the first distance is less than the first threshold distance.

16. The method of claim 15 further comprising:

retrieving, by the system, a third geographical location of equipment of an amateur radio operator;

plotting, by the system, the third geographical location of the equipment of the amateur radio operator;

determining, by the system, a second distance between the first geographical location and the third geographical location;

retrieving, by the system, a second signal transmission power rating for the equipment of the amateur radio operator;

comparing, by the system, the second distance to a second threshold distance that is based on the second signal transmission power rating for the equipment of the amateur radio operator; and determining, by the system, a second mitigation strategy to limit one of the potential sources of interference with the Internet protocol television signal that is caused by the equipment of the amateur radio operator on the Internet protocol television signal provided to the first geographical location when the second distance is less than the second threshold distance.

17. The method of claim 15 wherein one of the potential sources of interference with the Internet protocol television signal causes a signal degradation of the Internet protocol television signal.

18. The method of claim 15 wherein one of the potential sources of interference with the Internet protocol television signal causes pixelization of an output of the Internet protocol television signal.

19. The method of claim 15 further comprising:
retrieving, by the system, a third geographical location of a video ready access device associated with the new user installation request;
plotting, by the system, the third geographical location of the video ready access device;
determining, by the system, a second distance between the second geographical location and the third geographical location;
comparing, by the system, the second distance to a second threshold distance that is based on the first signal transmission power rating for the amplitude modulation broadcasting facility; and
determining, by the system, a second mitigation strategy to limit one of the potential sources of interference with the Internet protocol television signal that is caused by the amplitude modulation broadcasting facility on the Internet protocol television signal provided from the second geographical location to the first geographical location when the second distance is less than the second threshold distance.

20. The method of claim 19 further comprising:
determining, by the system, a projected route of an Internet protocol television cable between the third geographical location and the first geographical location;
plotting, by the system, the projected route of the Internet protocol television cable;
determining, by the system, a third distance between the second geographical location and the projected route of the Internet protocol television cable;
comparing, by the system, the third distance to a third threshold distance that is based on the first signal transmission power rating for the amplitude modulation broadcasting facility; and
determining, by the system, a third mitigation strategy to limit one of the potential sources of interference with the Internet protocol television signal that is caused by the amplitude modulation broadcasting facility on the Internet protocol television signal provided over the projected route of the Internet protocol television cable when the third distance is less than the third threshold distance.

* * * * *